R. B. MINOR.
CAN OPENER.
APPLICATION FILED DEC. 24, 1912.
1,406,750.
Patented Feb. 14, 1922.
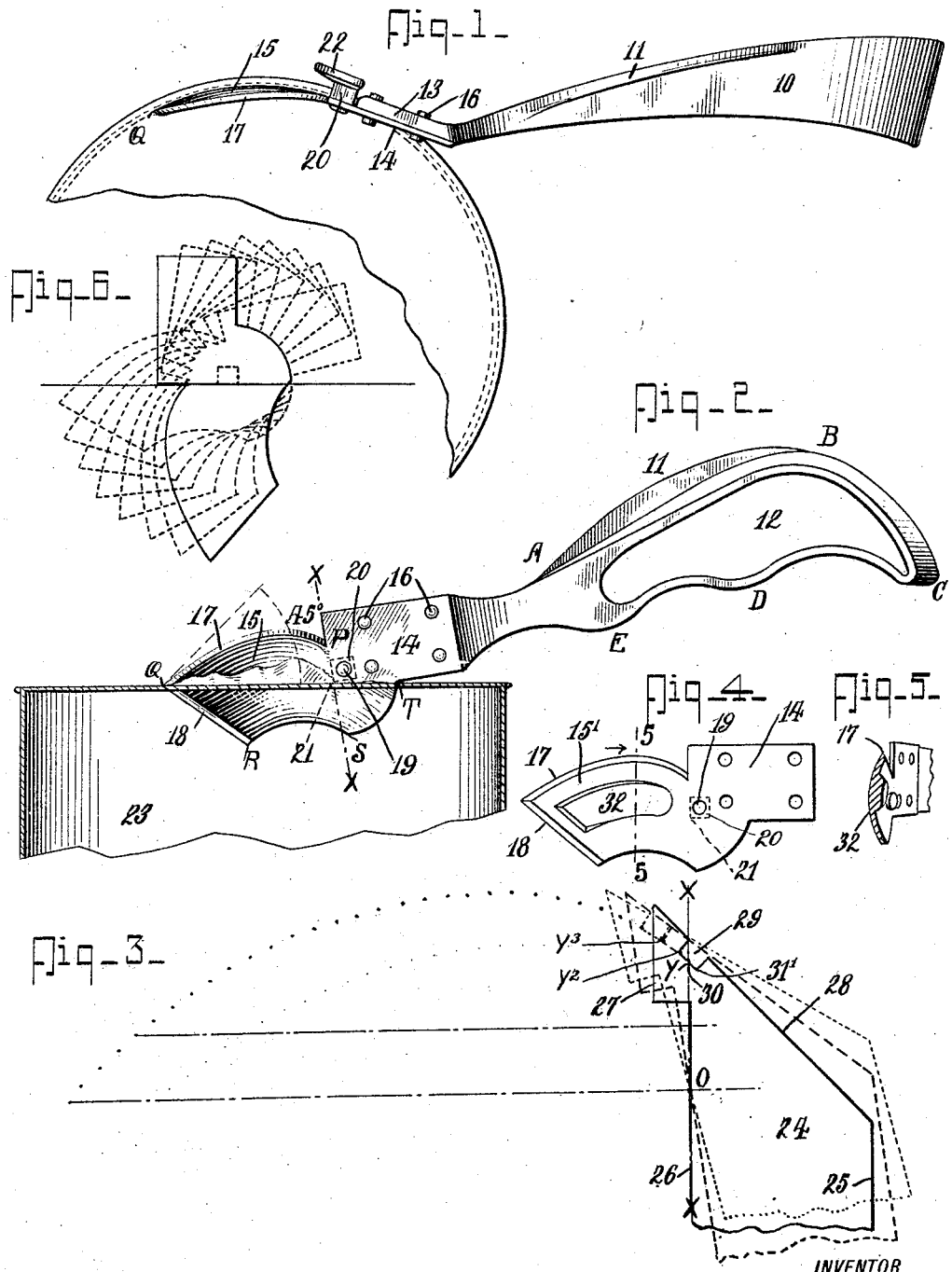
WITNESSES
Frank C. Palmer
B. Joffe
INVENTOR
ROBERT B. MINOR
BY
ATTORNEYS

UNITED STATES PATENT OFFICE.

ROBERT B. MINOR, OF SAN ANTONIO, TEXAS.

CAN OPENER.

1,406,750.  Specification of Letters Patent.  Patented Feb. 14, 1922.

Application filed December 24, 1912. Serial No. 738,425.

*To all whom it may concern:*

Be it known that I, ROBERT B. MINOR, a citizen of the United States, and a resident of the city of San Antonio, in the county of Bexar and State of Texas, have invented a new, useful, and Improved Can Opener, of which the following is a full, clear, and exact description and specification.

This invention relates to can-openers, and has reference more particularly to the class comprising a lever of the first order, with flat blades as well as those which are convexed.

The object of this invention is to provide a can-opener which will cut out the top of a can with facility, efficiency and rapidity, which will make a clean, smooth cut close to the vertical walls of the can, so as to make no jagged edge to endanger the hand during the cutting, and so as to leave a maximum and smooth edged aperture to facilitate ejection of contents entire, and also leave the can serviceable for the future, and will be inexpensive, light, strong and reliable.

The foregoing and other objects of this invention are attained in a preferred embodiment by providing a can-opener operating as a lever of the first order—with a blade having, projecting from its outer surface, a pivot with an edge thereon to bear upon the rim of the can as a fulcrum and serve as a fixed axis of revolution of the tool in operation, said axis being positioned normally to said surface, and a curved forward cutting edge lying in said surface and being a curve so generated and positioned, on a flat pattern, with relation to the projection of said axis that a straight line from the projection of said axis to any point on said curve will form a substantially constant angle of 45 degrees, or some substantially constant angle approximating 45 degrees, with a tangent to said curve at the same point, and so that a tangent to said curved forward cutting edge, at any point of its contact with the cut surface, during the cutting, will form with the cut surface a substantially constant angle of 45 degrees or some substantially constant angle approximating 45 degrees; and furthermore, for use on cylindrical cans, the blade of the can-opener has, on its outer surface, the shape of a sphere of same diameter as that of can to be opened, or of most commonly used size of can, this outer or convex spherical surface of the blade (containing the curved forward cutting edge) being positioned with relation to the pivot-edge, or fixed axis of revolution of the can-opener in operation, so that a diameter of the sphere of which the outer or convex surface of the blade is a part, will coincide (in position and direction) with said axis of revolution, or, in other words, the fixed axis of revolution is positioned diametrically or radially with relation to said convex spherical surface, and so that, throughout the revolution of the can-opener, in operation, the spherical outer or convex surface of the blade (including every point of the curved forward cutting edge) will pass tangent to the cylindrical wall of the can, just at the rim; whereby the top of the can will be cut by said cutting edge just at or close to the rim and the blade be held steadily in position, throughout the operation of the tool.

By the expression "outer surface" of the blade as used in these specifications, is meant that surface of the blade which in operation would be held next to the wall of the can; and by "inner surface" is meant the surface which would be held toward the middle of the can.

By the expression "revolution", as applied in these specifications to the tool in operation, is meant, of course, a partial revolution.

Reference is to be had to the accompanying drawings forming a part of these specifications, in which like characters of reference indicate corresponding parts in all the views. Figures 1, 2 and 5 represent particularly the can-opener with the spherically shaped blade. But from Figures 1 and 2 in connection with Figures 4 and 6, will be readily understood the flat blade for use in straight line cutting.

Figure 1 is a plan view of my invention in operation showing the spherically shaped blade.

Figure 2 is an elevation of same, also in operation.

Figure 3 is a plan view of a guide rule and its different positions while generating the curve of the cutting forward edge of the blade of my can-opener.

Figure 4 is a modified form of my blade.

Figure 5 is a section on line 5—5 of Figure 4; and

Figure 6 is a diagrammatic view showing the motion of the blade and the successive positions of its curved forward cutting edge, during operation. This figure presents exactly the flat blade, while also showing substantially the projection of the spherical blade.

As the efficiency of my can-opener depends on the relation (of construction and position) between the curved forward cutting edge 17 and the pivot-edge (or axis of revolution) projected in the point 21, a method of generating the curve of this cutting edge will now be given. This method of generating the curve of said cutting edge relates to a flat pattern; that is, the pattern of the curve must be constructed or generated "in the flat," whether for a flat blade or one that is convexed. A pattern of the blade having been constructed "in the flat," it can be convexed, giving a pattern for the convexed blade; or the blade having been constructed "in the flat," it can be convexed. After convexing, the projection of the curve of said cutting edge will differ little from the curve "in the flat," and said cutting edge will, at each successive point, present itself to the cut surface at a substantially unchanged angle.

The curve 17 begins at a point P (Figure 2), near to and in front of the center of revolution (the projection of the pivot edge or axis of revolution) 21, and is so generated and positioned with reference to said center of revolution that a straight line from said center to any point on the curve will make an angle of 45 degrees with a tangent to the curve at the same point. A curve, in general, can be considered as a polygon having an infinite number of sides, the sides being tangent to the curve and approaching said curve as a limit. Having the above in mind I form a guide rule 24, enlarged in the drawing (see Figure 3), to obviate confusion in lines. The essential features of this guide rule are, first, the straight edge or side 26, and second, the rectangular notch 29, so positioned (with relation to the edge 26) that its inner side (the line between the points $Y^2$ and $31'$) form an angle of 45 degrees with the prolongation of the edge 26 and be bisected by it at the point 30. The offset 27 is to give room for the position of the notch 29. The side of the offset and the side 25 are made parallel to the edge 26 and the end 28 is placed at the angle of 45 degrees with said edge, merely for convenience, their directions being unessential. The inner side of notch 29, that is, the line between the points $Y^2$ and $31'$, is of some predetermined diminutive length.

Draw a line X X, (Figure 3) and assume a point O on the same representing the projection 21 of the pivot edge or axis of revolution. Take a point Y (corresponding with P the beginning point of the curve as shown in Figure 2) on the same line, at a predetermined distance from the point O, and place the guide rule 24 (see Figure 3) so that the edge or side 26 of the guide rule will coincide with the base line X X, and the point 30 on the guide rule will fall on the point Y. It can be seen from Figure 2 of the drawings that the base line X X is normal with the general direction of the length of the can-opener. The point Y constitutes the beginning point of the curve. Firmly holding the guide rule 24 in the position described, draw the line Y $Y^2$ along the inner side of the rectangular notch 29. Said line will be tangent at the point Y to the curve to be traced, and will form an angle of 45 degrees with the line connecting the point Y with the center of revolution O; and said line Y $Y^2$ will be one-half of one of the sides of the polygon circumscribing the desired curve. Next, remove the guide-rule 24 and place a fine needle at the point O, and then replace the guide-rule so that its side or edge 26 will bear against the needle at the point O and the corner $31'$ of the notch 29 will register with the point $Y^2$. Then firmly holding the guide rule 24 in said position, draw a line $Y^2$ $Y^3$ along the inner side of the rectangular notch 29, which line $Y^2$ $Y^3$ will form an angle of 45 degrees with a line connecting its middle point with the point O, will be tangent at its middle point to the curve to be traced and will constitute one side of the polygon circumscribing the curve to be traced. By a continuous application and use of the guide-rule 24 in the manner last indicated, there will be formed a succession of little tangents or a polygonal line circumscribing the desired curve, from which polygonal line a pattern of the curve can be made by smoothing off the angles.

In the construction and positioning of said curve of the cutting edge (as well as in the construction of the guide-rule) the angle of 45 degrees is taken for the constant angle between a straight line from the center of revolution to any point on the curve and a tangent to the curve at the same point, because that angle combines the compatible maxima of advantage or facility in cutting and of speed in cutting. That angle is the proper one for ordinary uses of the tool. But by the substitution of a constant angle approximating 45 degrees approximately satisfactory results can be obtained. And for special work in which it may be desirable to gain mechanical advantage at the expense of speed in cutting, or vice versa, a slight variation of the angle above or below 45 degrees will be expedient. Hence my claims are made broad enough to cover a cutting edge constructed and positioned with reference to any constant angle approximating 45 degrees.

It is a distinctive characteristic of the curve of this cutting edge that it is generated and positioned with relation to a fixed center of revolution (the projection of a fixed pivot edge or fixed axis of revolution), and that the cutting edge revolves about this fixed pivot edge or fixed axis of revolution. And this is the case not only with the flat blades but with those which are convexed.

It is herein assumed that the rim (of the can) on which the pivot edge rests, is in the plane of the top of the can; whereas, in fact, this is rearely, if ever, the case. But in ordinary cans (such as those measuring four inches in diameter, or even larger ones) the rim extends very little above the surface of the top of the can; and in such cases the upward pressure of the cutting edge slightly raises the top, and the rim yields or is cut or crushed slightly downward by the pivot edge; so that in ordinary cans the above assumption is practically correct.

For cans in which the rim extends much above the surface of the top of the can, the construction and positioning of the cutting edge are the same as above described, except that the pivot and the point O are raised to a distance above the level of the beginning point Y equal to the height of the rim above the surface of the top of the can; in which case a straight line through the point O and the point Y will be the base line for the beginning of construction; on which line the edge 26 of the guide-rule will be laid, with the point 30 coinciding with the point Y, in order to draw the beginning of the desired polygon; the subsequent construction being as before, with the new point O as the center of revolution. No change would be made in the construction of the guide-rule. This change in the position of the point O makes a slight difference in the curve and its position; but the resulting curved forward cutting edge has the same characteristics as before, being merely adapted to a top with the exceptionally high rim.

The first corner $Y^2$ of the polygonal line can be found (without the use of the guide-rule) by drawing a straight line from the beginning point Y at an angle of 45 degrees with the base line X X and downward to the left, (supposing X X to be horizontal) and then marking on said line the desired corner at a distance from the beginning point equal to one half of one of the sides of the polygon.

It will not be necessary, for the ordinary uses of the can opener, to construct the polygonal line and curve beyond the point of their intersection with a line perpendicular to the base line X X and dropped from a point midway between the point O and the point Y, or thereabout.

A further essential to the efficiency of my can-opener in the form for use on cylindrical cans, is the spherical shape given to the outer surface of the main portion of the blade, together with the position of that spherical surface in relation to the pivot edge, or fixed axis of revolution of the tool in operation. Its proper shape is that of a sphere with a diameter equal to the diameter of the can to be opened, a diameter of which sphere must conincide (in position and direction) with the fixed axis of revolution of the tool in operation. Throughout the revolution of the can-opener in operation, the surface of the sphere, the outer, or convex spherical surface of the blade, will be and will remain tangent to the inner surface of the vertical cylindrical wall of the can, and the line or circle of tangency will be just inside of the rim of the top of the can where the top joins the cylindrical surface or wall of the can, and where the top is to be cut. Thus, in all positions of the revolving movement of the can-opener in operation, the blade will everywhere fit snugly against the cylindrical wall of the can just inside of the rim, and every point of the curved forward cutting edge (which everywhere lies in the convex, spherical surface of the blade) will pass tangent to the cylindrical wall of the can, and said cutting edge will everywhere strike and cut the top of the can just at or close against the rim, and the blade will be held steadily in position throughout the operation. The pivot edge or axis of revolution must, regularly, be held in the position of a diameter of the top of the can, or just above and parallel to it. In practical operation, however, it is sometimes convenient to lean the handle a little outward, in order to bring or keep said cutting edge close to the rim of the top, or in order to cause said cutting edge to avoid an obstruction on the inner wall of the can, such as a seam. The operator can with his hand so control the position of the tool and blade as to maintain a proper adjustment of the blade where such adjustment is not perfectly effected by means of the spherical shape and the positioning of the blade and by the flange on the end of the pivot.

Though, for use on cylindrical cans, the proper shape of the outer or convex surface of the blade is that of a sphere with a diameter equal to the diameter of the can to be opened, a blade constructed or shaped to any particular diameter will work satisfactorily on cans with diameters varying considerably above and below the diameter of the construction. The practical utility of the can-opener will be increased by adopting ordinarily as the diameter of construction the diameter of the most commonly used size of can.

The spherically shaped blade is available and intended for use not only on cylindrical cans, but also on cans of otherwise curved cross-sections, though it is not as perfectly adapted to the latter as to the former.

For cans having rectangular tops, or for any straight line cutting, the blade is left flat. For such blades, used on such tops, the axis of revolution of the tool in operation must be held in the plane of the top of the can, or just above and parallel to it, and at right angles with the line of the cut.

The pivot 20 has an edge 21 (Figure 2, showing their projections) which edge bears upon the rim of the can as a fulcrum and is the fixed axis of revolution of the can-opener in operation. In the case of the flat blade, this pivot and bearing edge are at right angles to the blade. In the case of the spherically shaped blade, the pivot and bearing edge (the axis of revolution) are so positioned that if the line of said bearing edge were extended through the blade it would coincide with a diameter of a sphere of which the outer or spherical surface of the blade is a part. And to state the position of the fixed axis, with relation to the outer surface of the blade, in a general way applicable to all surfaces, whether flat or convexed it is positioned normally to said surface, the word "normally" being used in a broad sense to include either a line intersecting perpendicularly a plane surface, or a line intersecting a curved surface so as to be perpendicular to a tangent to that surface at the point of intersection. The pivot may be riveted to the blade, with a square neck to prevent turning, or it may be cast integrally with the blade. The pivot 20 (Figure 1) has on its end a flange 22 which engages the wall of the can and holds the pivot in position on the rim of the can. This flange may have the shape of a half disk (approximately), centrally disposed on the end of the pivot and slightly more than a semi-circle in extent so as to cover the end of the pivot, as in Figure 1, or the forward portion may be cut off flush with the side of the pivot, leaving approximately the shape of a quadrant.

Thus there are two main, distinctive and essential features of my invention, namely, (1) the curved forward cutting edge 17 of the peculiar construction and positioning described, that is related (both in construction and position) to the pivot edge or fixed axis of revolution as described, and (2) the spherically shaped blade, positioned as described with relation to the pivot edge or fixed axis of revolution.

For straight line cutting the second feature is of no advantage whatever. A can-opener with the first feature and with a flat blade will operate to perfection for straight line cutting, of course, with the accessory features of pivot with pivot edge, handle and piercing point. This first feature, therefore, is independent of the second and is separately claimed.

For curved line cutting, especially circular cutting on cylindrical cans, the second feature is essential. The second feature is independent of the first, absolutely speaking, though not for the best results. A can-opener possessing the second feature would, without the first feature, that is with a differently constructed and positioned forward cutting edge, (lying in the convex spherical surface) work more satisfactorily than any can-opener, except mine. Therefore, the second feature (though described as in combination with the first) is independent (absolutely speaking) of the first, and is separately claimed. However, the second feature will work to best advantage only in combination with the first. Therefore, these two main features are claimed in combination as well as separately.

This description of my can-opener and of the mode of operating it, relates more especially to the can-opener with the spherically shaped blade in combination with my peculiar curved forward cutting edge, at the same time covering as far as applicable the can-opener with the flat blade and describing the two main and independent features aforesaid.

To operate the can-opener, grasp the handle so that the curve BC will fit the hollow of the hand, the point B being forward. Then with the point Q pierce the top of the can close to the edge or rim of the top, and so that the blade, as it enters, will fit its outer surface close against the vertical wall of the can. Insert the blade down until the square pivot 20 rests on the rim of the top of the can. Then, the grasp of the handle being shifted so that the point B will fit in the hollow of the hand and the fingers fit in the depressions or curves ED and DC, the handle of the can-opener is pried downward and the edge 21 of the pivot 20 bears down on the rim of the top of the can (which rim serves as a fulcrum); and the curved forward cutting edge 17 cuts upward, making a gash in the top of the can along and close to the rim of the top. Next, the handle is raised, lowering the point Q; the can-opener is advanced, so that the pivot-edge 21 will take a new and advanced position on the rim, and the handle is again pried downward, the curved forward cutting edge 17 cutting another gash upward. This operation is repeated until the can-opener is worked around the edge or rim of the top of the can, cutting loose the whole of the top of the can, or leaving a portion uncut, as may be preferred. (The references in this description of operation relate especially to Figure 2).

It must be understood that the blade and handle of my can-opener may be cast or otherwise made integrally, or formed separately and fastened together with rivets. (See 16).

Referring more particularly to the drawings, 10 is the handle which is riveted to the blade (unless formed integral with it), and has a peculiar shape or curvature ABCDE, found by me to be most convenient for the hand. The curving end and back of the handle BC fit the hollow of the hand; while the curves AB, BC, CD and DE, respectively, receive and fit the hand and fingers when grasping the handle. A ridge or flange 11 provided on the back of the handle between the points A and B, reinforces the handle; while an orifice 12 formed substantially parallel with the contour of curvature ABCDE, lightens the handle and leaves it sufficiently strong. A flat portion 13 of the handle, formed at a proper angle to the body of the handle, receives the blade, being fixed to a flat portion thereof, 14, by rivets, or otherwise, unless formed integral with it. The angle of the flat portion of the handle and the body of it, causes the handle, during operation, to stand out, so that the hand will not strike the can.

The curved cutting-edge 17 and the edge 18 are formed by the outer surface of the blade and bevels on the inner side of the blade converging into the outer surface of the blade, thus causing said edges to lie exactly in the outer surface of the blade, which construction is essential to the proper working of the tool, especially as to the cutting edge 17, and tends in itself to cause the blade to cut the top close to the rim of the can. The edge 18 is a cutting edge, but only for the purpose of cutting an opening for the insertion of the blade, and this edge and the curved forward cutting edge 17 form the piercing point Q.

The blade has a rear lower curved edge R S, which is substantially parallel to, that is, everywhere equidistant (along horizontal lines) from the curved forward cutting edge 17. (See Figure 6). Its functions are to lessen resistance in inserting the blade, to ease and steady the movement of the blade in insertion, to economize material, and to give symmetry of shape.

The rear upper curve ST is approximately a segment of a circle having its center at the point O, the center (projection of axis) of revolution of the can-opener in operation, but with a radius gradually increasing as the curve goes upward. This curve, bearing against the back of the cut, compensates for the wear or yielding of the tin at the back of the cut, and gives a forward thrust or impetus to the cutting edge 17, but only at the start. The rear edges R S and S T are not cutting edges, but blunt.

For some uses my can-opener can be constructed with a projection 32 (Figures 4 and 5), positioned on the inner surface of the blade, the object of this projection being to clear an opening for the advancement of the can-opener after each cut. The projection is placed far enough from the pivot to permit the top of the can to pass between them and so that the projection will not interfere with such advancement. For ordinary uses this projection is not necessary.

Having thus described my invention, I claim as new and desire to secure by Letters Patent:

1. In a device of the class described, a blade having, projecting from its outer surface, a pivot with an edge forming a fixed axis of revolution positioned normally to said surface, the blade having also a curved forward cutting edge, lying in said surface, and being a curve so generated and positioned, on a flat pattern, with relation to the projection of said axis, that a straight line drawn from the projection of said axis to any point on said curve will form a substantially constant angle approximating 45 degrees with a tangent to said curve at the same point, substantially as described.

2. In a device of the class described, a blade having a spherical outer, convex surface, containing a forward cutting edge, and, projecting from said surface, a pivot with an edge forming a fixed axis of revolution, said axis being positioned radially with relation to said surface, substantially as described.

3. In a device of the class described, the combination of a blade having a spherical outer, convex surface, a pivot projecting therefrom, said pivot having an edge forming a fixed axis of revolution, positioned radially with relation to said surface, and said blade having a curved forward cutting edge, lying in said surface, and being a curve so generated and positioned, on a flat pattern, with relation to the projection of said axis, that a straight line drawn from the projection of said axis to any point on said curve will form a substantially constant angle approximating 45 degrees with a tangent to said curve at the same point, substantially as described.

4. In a device of the class described, the combination of a blade having, projecting from its outer surface, a pivot with an edge forming a fixed axis of revolution positioned normally to said surface, the blade having also a curved forward cutting edge, lying in said surface, and being a curve so generated and positioned, on a flat pattern, with relation to the projection of said axis, that a straight line drawn from the projection of said axis to any point on said curve will form a substantially constant angle approximating 45 degrees with a tangent to said curve at the same point, said blade also having a rear cutting edge diverging from said curved forward cutting edge and forming a piercing point, and a rear lower curved edge R S, substantially parallel to said curved forward cutting edge, to lessen resistance and ease and steady the movement of the blade in insertion, substantially as described.

5. In a device of the class described, the combination of a blade having, projecting from its outer surface, a pivot with an edge forming a fixed axis of revolution positioned normally to said surface, the blade having also a curved forward cutting edge, lying in said surface, and being a curve so generated and positioned, on a flat pattern, with relation to the projection of said axis, that a straight line drawn from the projection of said axis to any point on said curve will form a substantially constant angle approximating 45 degrees with a tangent to said curve at the same point, said blade also having a rear upper curved edge S T, approximating a segment of a circle with its center at the projection of said pivot edge.

6. In a device of the class described, the combination of a blade having, projecting from its outer surface, a pivot with an edge forming a fixed axis of revolution positioned normally to said surface, the blade having also a curved forward cutting edge, lying in said surface, and being a curve so generated and positioned, on a flat pattern, with relation to the projection of said axis, that a straight line drawn from the projection of said axis to any point on said curve will form a substantially constant angle approximating 45 degrees with a tangent to said curve at the same point, said blade also having on its inner surface, near and parallel to said curved forward cutting edge, a projection, to clear an opening for the advancement of the blade, substantially as described.

In testimony whereof I have signed my name to this specification in the presence of two subscribing witnesses.

ROBERT B. MINOR.

Witnesses:
FLEET T. WHITE,
JEPTHA W. DIBRELL.